United States Patent
Salcedo et al.

(10) Patent No.: US 12,377,980 B2
(45) Date of Patent: Aug. 5, 2025

(54) PASSENGER SEAT HEADREST DIVIDER ASSEMBLY

(71) Applicant: Safran Seats USA LLC, Gainesville, TX (US)

(72) Inventors: Francisco Salcedo, Argyle, TX (US); Paul Bentley, Gainesville, TX (US); Justin Murnan, Whitesboro, TX (US); Christopher Stewart, Saint Jo, TX (US)

(73) Assignee: Safran Seats USA LLC, Gainesvville, TX (US)

( * ) Notice: Subject to any disclaimer, the term of this patent is extended or adjusted under 35 U.S.C. 154(b) by 0 days.

(21) Appl. No.: 18/035,510

(22) PCT Filed: Dec. 2, 2020

(86) PCT No.: PCT/US2020/062806
§ 371 (c)(1),
(2) Date: May 4, 2023

(87) PCT Pub. No.: WO2022/119562
PCT Pub. Date: Jun. 9, 2022

(65) Prior Publication Data
US 2023/0406509 A1 Dec. 21, 2023

(51) Int. Cl.
*B64D 11/06* (2006.01)
(52) U.S. Cl.
CPC ...... *B64D 11/0606* (2014.12); *B64D 11/0646* (2014.12)

(58) Field of Classification Search
CPC ............ B64D 11/0642; B64D 11/0606; B60N 2/806; B60N 2/879; B60N 2/885
See application file for complete search history.

(56) References Cited

U.S. PATENT DOCUMENTS 2,464,435 A * 3/1943 Conradt ................ B60N 2/882
297/397
4,205,878 A * 6/1980 Wooten .................... A47C 7/38
297/391

(Continued)

FOREIGN PATENT DOCUMENTS

| DE | 102015114382 A1 * | 3/2017 | |
| JP | 2016159866 A | 9/2016 | |
| WO | WO-2021069883 A1 * | 4/2021 | ......... B64D 11/0023 |

OTHER PUBLICATIONS

International Patent Application No. PCT/US2020/062806, International Search Report and Written Opinion, dated Aug. 4, 2021.

*Primary Examiner* — Richard G Davis
(74) *Attorney, Agent, or Firm* — Kilpatrick Townsend & Stockton LLP

(57) ABSTRACT

A passenger seat includes a seat back and a headrest supported on the seat back. The headrest includes a pair of opposing lateral sides, and the headrest may be adjustable relative to the seat back along an axis. A divider assembly having a divider may be attached to the headrest. The divider of the divider assembly is movable with the headrest relative to the seat back, and the divider may be movable relative to the headrest between a stowed position and a deployed position. In the deployed position, the divider extends forward from a first lateral side of the pair of opposing lateral sides of the headrest.

7 Claims, 11 Drawing Sheets

(56) References Cited

U.S. PATENT DOCUMENTS

| | | | | |
|---|---|---|---|---|
| 5,904,405 A * | 5/1999 | Wu | B60N 2/818 | 297/216.12 |
| 6,120,099 A * | 9/2000 | Reikerås | B60N 2/868 | 297/391 |
| 6,250,716 B1 * | 6/2001 | Clough | A47C 7/383 | 297/391 |
| 6,305,749 B1 * | 10/2001 | O'Connor | B60N 2/868 | 5/636 |
| 6,648,416 B2 * | 11/2003 | O'Connor | B60N 2/868 | 5/636 |
| 7,364,239 B2 * | 4/2008 | Clough | B60N 2/885 | 297/391 |
| 7,631,935 B2 * | 12/2009 | Chen | B60N 2/2851 | 297/391 |
| 8,911,020 B2 * | 12/2014 | Westerink | B60N 2/885 | 297/406 |
| 8,985,622 B1 * | 3/2015 | Cannon | B60R 21/231 | 280/730.2 |
| 9,028,000 B2 * | 5/2015 | Millan | B60N 2/24 | 297/391 |
| 10,960,801 B2 * | 3/2021 | Novin | B60N 2/85 | |
| 2002/0033628 A1 * | 3/2002 | Clough | B60N 2/885 | 297/410 |
| 2003/0146654 A1 * | 8/2003 | Nguyen | B64D 11/0606 | 297/232 |
| 2004/0007910 A1 * | 1/2004 | Skelly | B64D 11/06 | 297/284.3 |
| 2004/0195893 A1 * | 10/2004 | Clough | A47C 7/38 | 297/391 |
| 2005/0121963 A1 * | 6/2005 | Williamson | B60N 2/01508 | 297/408 |
| 2007/0108827 A1 * | 5/2007 | Clough | B60N 2/885 | 297/391 |
| 2013/0221722 A1 * | 8/2013 | Navarro | B60N 2/885 | 297/391 |
| 2016/0214513 A1 * | 7/2016 | Millan | B60N 2/838 | |
| 2017/0197529 A1 * | 7/2017 | Hontz | B60N 2/885 | |
| 2017/0368970 A1 * | 12/2017 | Lessard | B60N 2/885 | |
| 2019/0217957 A1 * | 7/2019 | Wilson | B60N 2/809 | |
| 2020/0039407 A1 * | 2/2020 | Zhou | B60N 2/853 | |
| 2020/0238873 A1 * | 7/2020 | Akaike | B60N 2/879 | |
| 2020/0262565 A1 * | 8/2020 | Wanner | B64D 11/0642 | |
| 2021/0345780 A1 * | 11/2021 | Clough | B64D 11/0646 | |

* cited by examiner

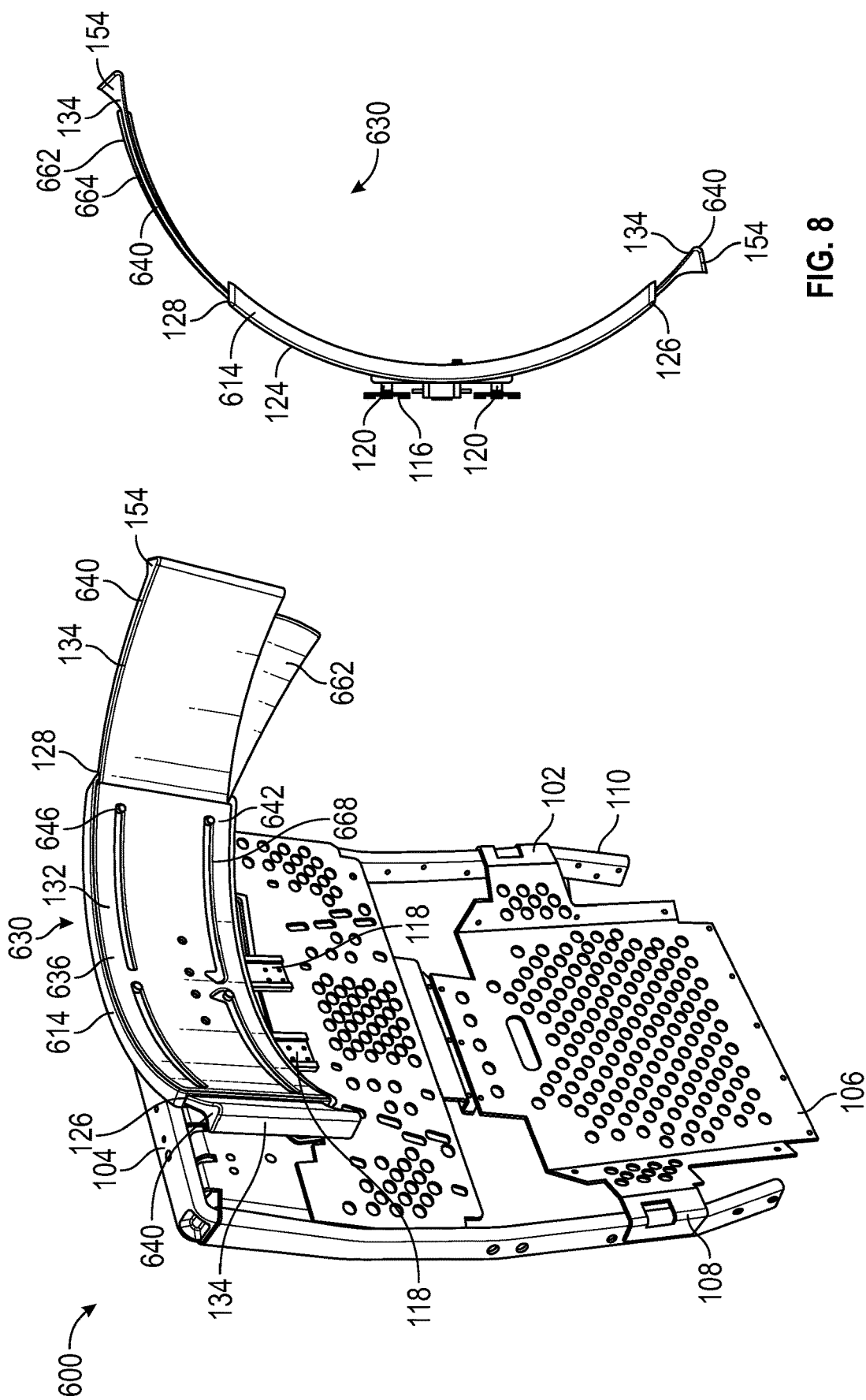

PASSENGER SEAT HEADREST DIVIDER ASSEMBLY

FIELD OF THE INVENTION

The field of the invention relates to privacy features for seats of passenger vehicles such as aircrafts.

BACKGROUND

Passenger comfort can be an important consideration in carrier industries, particularly with air carriers. To this end, most seats in commercial passenger aircraft include features such as armrests and headrests to support different parts of a passenger's body when seated. Generally, armrests provide a physical structure that delineates a boundary between where the living space of one passenger seat ends and where that of another begins. Yet, the separation between living spaces of adjacent seats is sometimes nebulous or imprecise, such as in situations in which adjacent seat backs are separated merely by a single armrest that may be utilized by either one or both of passengers seated on opposite sides of the armrest. As a result, many existing passenger seat arrangements may cause passengers to uncomfortably feel a lack of privacy or clear boundaries relative to living spaces of adjacent seats. Moreover, a passenger seeking isolation from another passenger for various reasons (e.g., health reasons) may be limited their personal belongings (e.g., masks, scarfs, and other individual face coverings).

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat includes a seat back, a headrest, and a divider assembly. The headrest is supported on the seat back and includes a pair of opposing lateral sides. The headrest may be adjustable relative to the seat back along an axis. The divider assembly includes a divider that is attached to the headrest. The divider is movable with the headrest relative to the seat back, and in certain embodiments, the divider is movable relative to the headrest between a stowed position and a deployed position. In the deployed position, the divider extends forward from a first lateral side of the pair of opposing lateral sides of the headrest.

In some embodiments, the divider assembly includes a support attached to the headrest that attaches the divider to the headrest. The divider may be movable relative to the support. In various embodiments, the support defines an axis, and the divider includes a fan that is rotatable about the axis relative to the support. In some embodiments, the fan includes a fan surface, and, in the deployed position, an exposed portion of the fan surface is greater than an exposed portion of the fan surface in the stowed position. In certain embodiments, the support includes a support panel that is slidable relative to the headrest, and the divider includes a divider panel that is slidable relative to the support panel. In some cases, a sliding axis of the support panel is parallel to a sliding axis of the divider panel. In various embodiments, the support defines an elongated channel that is arcuate shaped in a forward and aft direction, and the divider includes an arcuate shaped panel that is slidable within the elongated channel between the stowed position and the deployed position.

In various embodiments, in both the stowed position and the deployed position, the divider extends laterally outwards and forward relative to the first lateral side of the headrest.

According to certain embodiments of the present invention, a passenger seat includes a headrest and a divider assembly. The headrest includes a first lateral side and a second lateral side, and the divider assembly includes a support and a divider. The support of the divider assembly may be attached to the headrest, and the divider may be movable relative to the support such that the divider is movable relative to the headrest. In certain embodiments, the divider is movable relative to the support between a stowed position and a deployed position, and, in the deployed position, the divider extends forward from the first lateral side of the headrest.

In some embodiments, the headrest includes a main panel and a side wing, and the side wing is movable relative to the main panel between the stowed position and the deployed position. In certain embodiments, the side wing defines the first lateral side and the second lateral side.

The support may define an axis, and in some embodiments, the divider includes a fan that is rotatable about the axis relative to the support. In various embodiments, the fan includes a fan surface, and, in the deployed position, an exposed portion of the fan surface is greater than an exposed portion of the fan surface in the stowed position.

In certain embodiments, the support includes a support panel that is slidable relative to the headrest, and the divider includes a divider panel that is slidable relative to the support panel. In various embodiments, in both the stowed position and the deployed position, the divider extends laterally outwards and forward relative to the first lateral side of the headrest. In some embodiments, the support defines an elongated channel that is arcuate shaped in a forward and aft direction, and the divider includes an arcuate shaped panel that is slidable within the elongated channel between the stowed position and the deployed position.

According to certain embodiments of the present invention, a passenger seat includes a seat back, a headrest, and a divider assembly. The headrest may be supported on the seat back and movable relative to the seat back, and the headrest may include a first lateral side and a second lateral side. The divider assembly includes a divider supported on the headrest. In some embodiments, the divider is movable relative to the headrest between a stowed position and a deployed position. In various embodiments, in both the stowed position and the deployed position, the divider extends laterally outwards and forward relative to the first lateral side of the headrest.

In some embodiments, in the deployed position, the divider extends forward relative to the divider in the stowed position. The divider may include a fan having a fan surface, and, in the deployed position, an exposed portion of the fan surface may be greater than an exposed portion of the fan surface in the stowed position. In certain embodiments, the divider is slidable relative to the headrest in a forward and aft direction.

In various embodiments, the divider assembly includes a support panel attached to the headrest that attaches the divider to the headrest. The divider may include a divider panel, the support panel may be slidable relative to the headrest, and the divider panel may be slidable relative to the support panel. In certain embodiments, the divider assembly includes a support attached to the headrest. The support may attach the divider to the headrest. In some embodiments, the support defines an elongated channel that is arcuate shaped in a forward and aft direction, and the divider may include an arcuate shaped panel that is slidable within the elongated channel between the stowed position and the deployed position.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

FIG. 7 is another perspective view of the passenger seat of FIG. 6.

FIG. 8 is a top view of the headrest and divider assembly of FIG. 6

DETAILED DESCRIPTION

Figure 2:
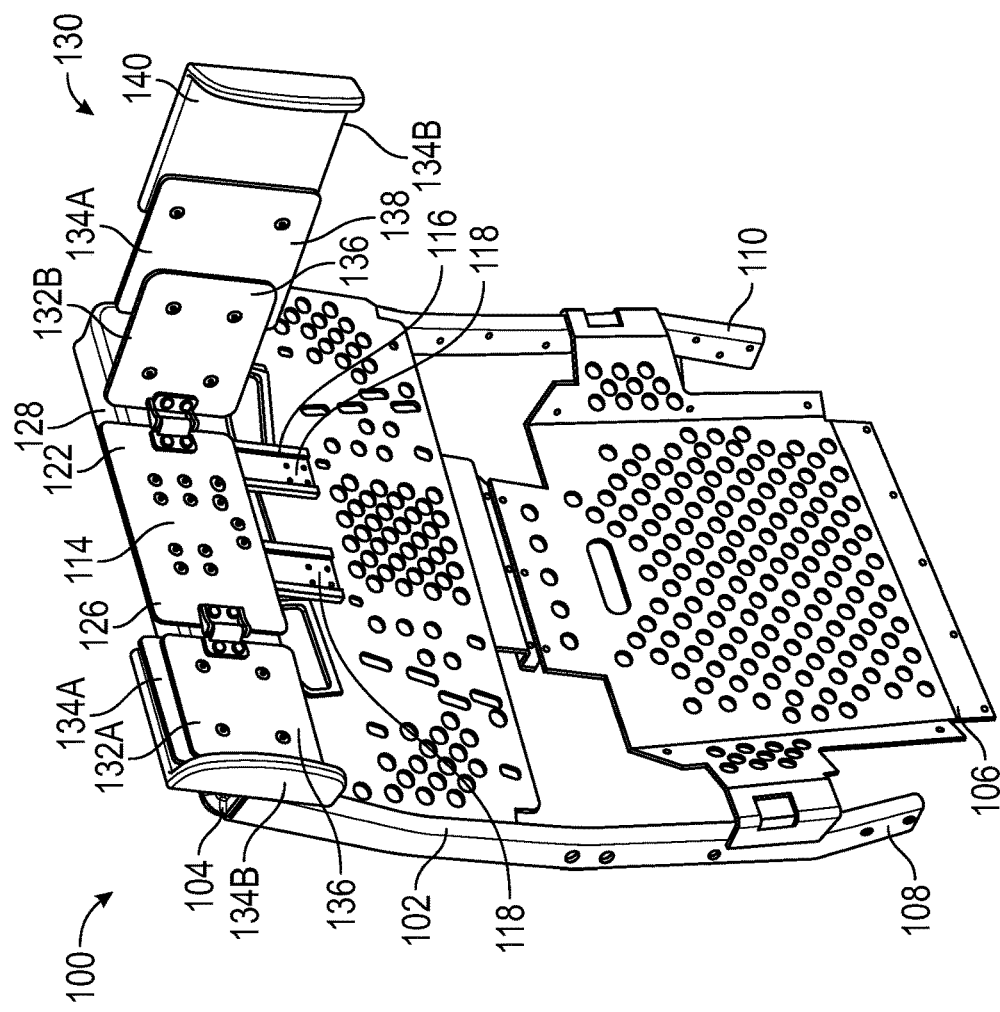
FIG. 2 is another perspective view of the passenger seat of FIG. 1.
Figure 1:
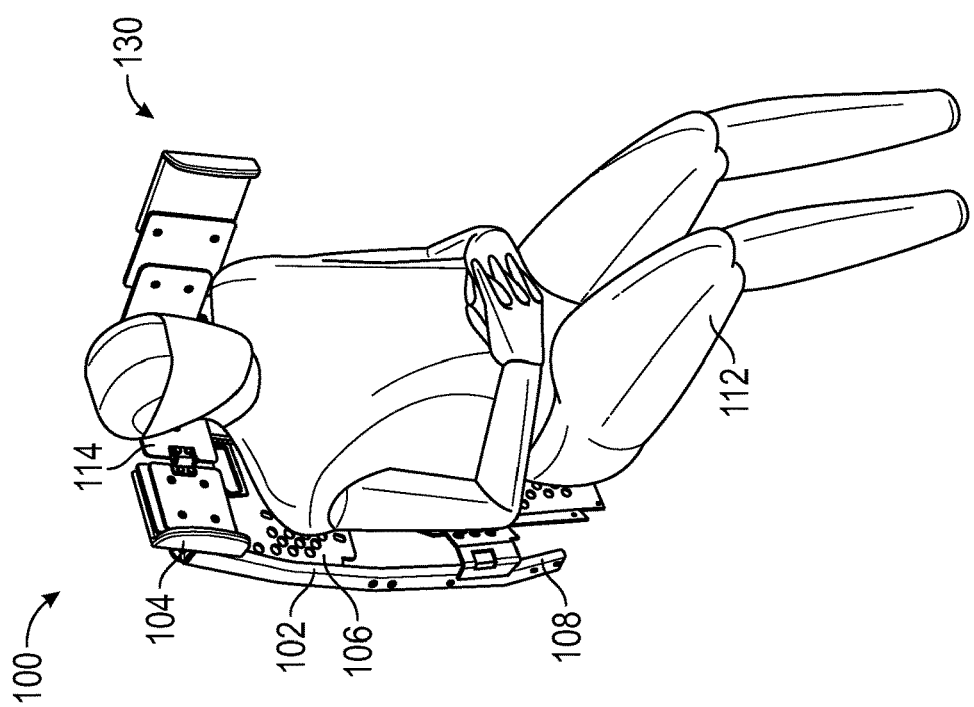
FIG. 1 is a perspective view of a portion of a passenger seat with a headrest and a divider assembly according to embodiments of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "forward," and "aft," among others, are intended to refer to the orientation as illustrated and described in the figure (or figures) to which the components and directions are referencing.

The described embodiments of the invention provide divider assemblies for passenger seats. While the divider assemblies are discussed for use with aircraft seats, they are by no means so limited. Rather, embodiments of the divider assemblies may be used in passenger seats or other seats of any type or otherwise as desired. For example, embodiments may be used on trains, buses, movie theaters, student seating, or any other instance when privacy between adjacent seats may be useful.

According to certain embodiments of the invention, as shown in FIGS. 1-4, a passenger seat 100 includes a seat back 102 having a top end 104, a forward side 106, an aft side opposite from the forward side 106, a first lateral side 108 extending between the forward side 106 and the aft side, and a second lateral side 110 extending between the forward side 106 and the aft side. The seat back 102 may be connected to a seat base (not illustrated), and the seat back 102 and the seat base may together define a space for a passenger 112 to sit in or otherwise use. While not illustrated in FIGS. 1-4, the seat back 102 may include various cushioning, coverings, and/or other features as desired.

In various embodiments, the passenger seat 100 includes a headrest 114 that may support a head of the passenger 112 when the passenger seat 100 is used. The headrest 114 may be attached to various locations of the seat back 102 as desired. In the embodiment of FIGS. 1-4, the headrest 114 is attached to the forward side 106 of the seat back 102. In certain embodiments, the headrest 114 is movably connected to the seat back 102 via one or more adjusters 116 such that a position of the headrest 114 on the seat back 102 and/or relative to the top end 104 can be adjusted as desired. In certain embodiments, the headrest 114 may be movable along an axis that may be between the first lateral side 108 and the second lateral side 110, although the axis may be at various other locations and/or extend in various other directions as desired. In the embodiment of FIGS. 1-4, the adjusters 116 include a pair of rails 118 on the seat back 102 and a pair of sliders 120 on the headrest 114. In this embodiment, the sliders 120 engage the rails 118 and are slidable along the rails 118 (see, e.g., FIG. 3). In other embodiments, the adjusters 116 need not be rails 118 and sliders 120, and/or the headrest 114 need not be slidable relative to the seat back 102. Instead, the adjusters 116 may be various other suitable devices or mechanisms that may allow for the headrest 114 to be moved relative to the seat back 102, including but not limited to rollers, hooks, pins, slots, gears, combinations thereof, or other suitable mechanisms or devices as desired.

The headrest 114 includes a forward side 122, an aft side 124 opposite from the forward side 122, a first lateral side 126 extending between the forward side 122 and the aft side 124, and a second lateral side 128 opposite from the first lateral side 126 and extending between the forward side 122 and the aft side 124. When the headrest 114 is used by the passenger 112, the forward side 122 may face the passenger 112.

In various embodiments, a divider assembly 130 is supported on the headrest 114 that can selectively provide improved privacy and/or a physical barrier for the passenger 112 to utilize as desired. In some embodiments, the divider assembly 130 is attached to the headrest 114 such that the divider assembly 130 is movable with the headrest 114 relative to the seat back 102. In certain cases, the divider assembly 130 attached to the headrest 114 may provide improved adjustability to accommodate a large range of passenger sizes. In other embodiments, a passenger seat may include a seat shell or support structure, and the divider assembly 130 may be supported on the seat shell (see, e.g., FIGS. 17-20).

The divider assembly 130 includes at least one support 132 and at least one divider 134. In some embodiments, at least the at least one divider 134 is movable relative to the headrest 114, and in some optional embodiments, the at least one support 132 is movable relative to the headrest 114. The at least one divider 134 and/or the at least one support 132 may be movable via various suitable mechanisms or devices as desired, including, but not limited to, rails and sliders, pins and grooves, pins and slots, rollers, hinges, combinations thereof, or other suitable devices or mechanisms as desired. The at least one divider 134 (and optionally the at least one support 132) may be movable relative to the headrest 114 between a stowed position and a deployed position. In some embodiments, in the deployed position, the at least one divider 134 extends forward from the forward side 122 of the headrest 114. The at least one divider 134 in the deployed position extending forward from the forward side 122 may provide a physical barrier that the passenger 112 can use for improved privacy and/or to self-isolate from other passengers. Optionally, in the stowed position, a portion of the at least one divider 134 may extend forward from the forward side 122 of the headrest 114, although it need not in other embodiments. In embodiments where the portion of the at least one divider 134 extends forward while in the stowed position, a forward-most extent of the at least one divider 134 may be less than a forward-most extent of the divider 134 in the deployed position.

The at least one divider 134 and/or the at least one support 132 may be constructed from various suitable materials as desired, including but not limited to various metals, plastics, composites, combinations thereof, or other materials as desired. In some embodiments, the at least one divider 134 and/or the at least one support 132 may be constructed from materials that are easily cleaned and/or disinfected between uses.

Figure 3:
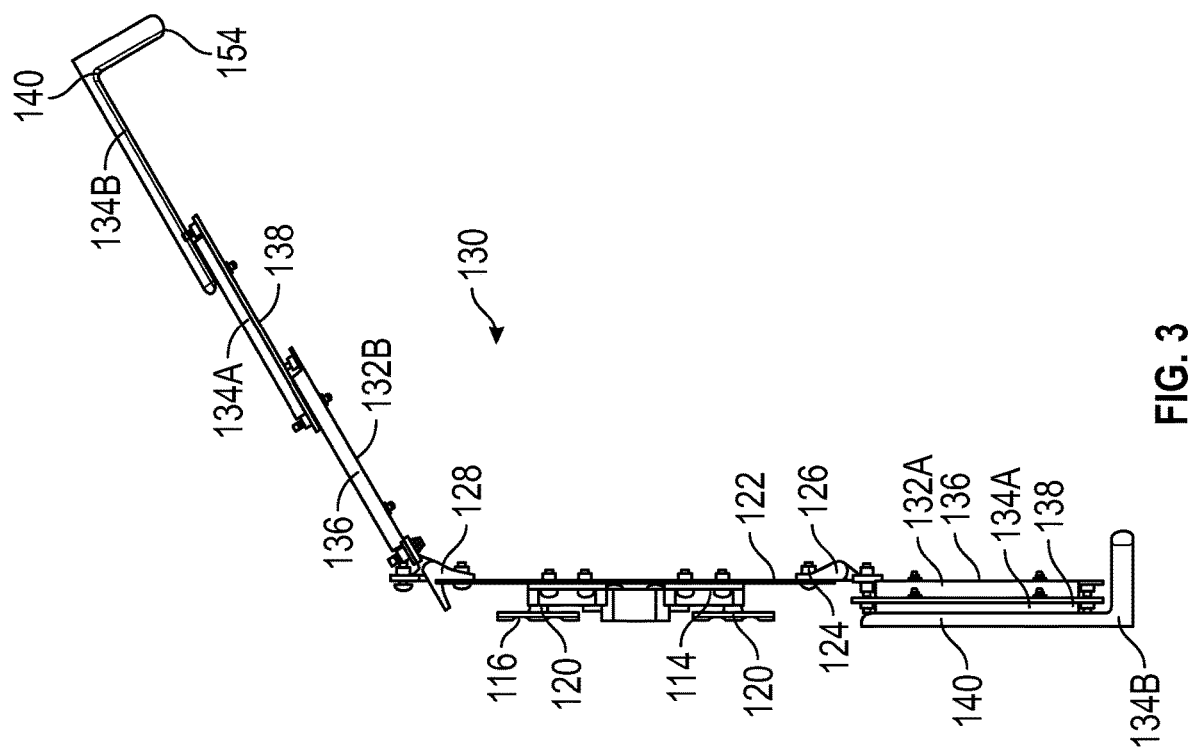
FIG. 3 is a top view of the headrest and divider assembly of FIG. 1.

In the embodiment of FIGS. 1-4, the divider assembly 130 includes two supports 132 and four dividers 134. In this embodiment, a first support 132A and a second support 132B are each a support panel 136. The first support 132A may be attached to the first lateral side 126, and the second support 132B may be attached to the second lateral side 128. In the embodiment of FIGS. 1-4, the supports 132A-13 are each pivotably attached to the headrest 114 such that the supports 132 are movable relative to the headrest 114 in a forward and aft direction about a pivot axis. In certain embodiments, the supports 132 may be pivotable between a stowed position (see support 132A) and a deployed position (see support 132B). Optionally, in the stowed position, the support may be substantially parallel to the forward side 122 of the headrest 114, although it need not in other embodiments. In certain cases, and as best illustrated in FIG. 3, in the deployed position, the support may extend at an angle such that the support is not parallel to the forward side 122 of the headrest 114

Figure 4:
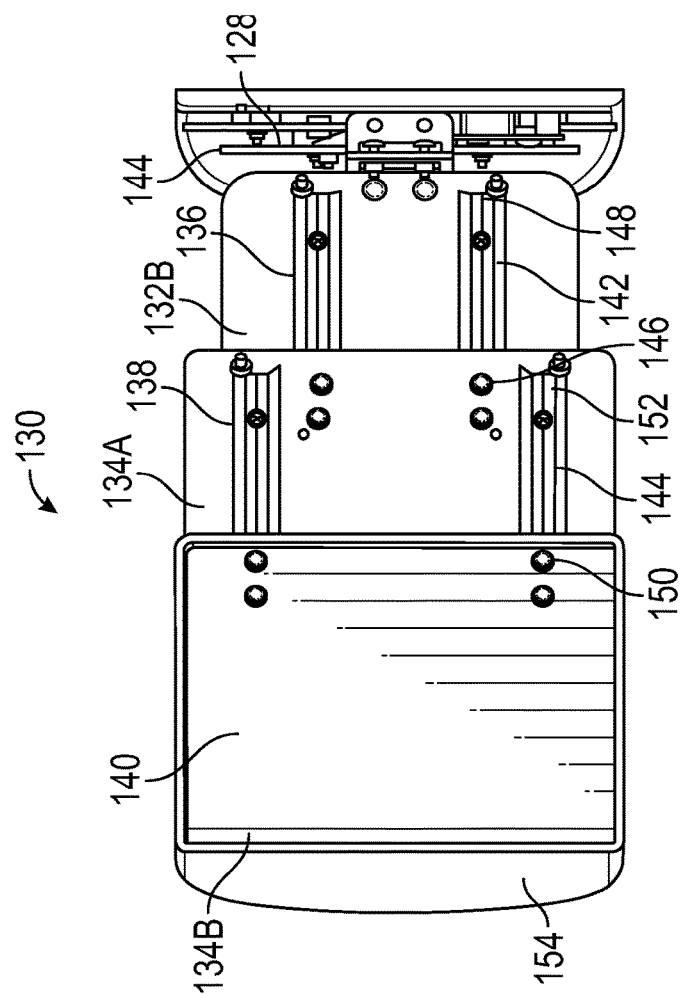
FIG. 4 is a side view of the headrest and divider assembly of FIG. 1.

In the embodiment of FIGS. 1-4, the dividers 134 include first dividers 134A and second dividers 134B. In other embodiments, a single divider or more than two dividers may be utilized on a particular lateral side of the headrest 114. Moreover, the number of dividers on each side of the headrest 114 need not be the same, and the divider assembly 130 may be asymmetrical. In the embodiment illustrated in FIGS. 1-4, the first dividers 134A are each intermediate divider panels 138, and the second dividers 134B are each end divider panels 140. In certain embodiments, and as best illustrated in FIG. 4, a size of the end divider panels 140 may be greater than a size of the intermediate divider panels 138 and a size off the intermediate divider panels 138 may be greater than a size of the support panels 136, although they need not be in other embodiments. Optionally, the end divider panels 140 may include a gripping portion 154 that a user may selectively grip or hold to move the dividers between the stowed position and the deployed position, which is discussed in detail below.

In some embodiments, the intermediate divider panels 138 are each movable relative to the corresponding support panels 136 via first divider adjusters 142, and the end divider panels 140 are each movable relative to the corresponding intermediate divider panels 138 via second divider adjusters 144. In the embodiment of FIGS. 1-4, the first divider adjusters 142 include first pins 146 that are slidable in first grooves 148 and the second divider adjuster 144 include second pins 150 that are slidable in second grooves 152. In this embodiment, a sliding axis of the first divider adjusters 142 may be substantially parallel to a sliding axis of the second divider adjuster 144, although it need not be in other embodiments. In other embodiments, the first divider adjusters 142 and/or the second divider adjusters 144 may be various other suitable types of adjusters as desired, and the type of adjusters used for the first divider adjusters 142 need not be the same as the type of adjusters used for the second divider adjusters 144.

The dividers 134A-B are movable between a stowed position (see, e.g., the dividers 134A-B on the support 134A) and a deployed position (see, e.g., the dividers 134A-B on the support 132B). It will be appreciated that the dividers 134A-B may be in a stowed position or a deployed position relative to the supports 134 regardless of whether the supports 134 are in a stowed position or a deployed position relative to the headrest 114. In certain embodiments, an exposed surface area of the divider assembly 130 (and/or a forward-most extent) in the deployed position may be greater than in the stowed position.

As best illustrated in FIG. 3, when both the supports 132 and the dividers 134 are in the deployed position, the supports 132A-B, the first dividers 134A, and the second dividers 134B each extend forward relative to the forward side 122 of the headrest 114. In some cases, when both the supports 132 and the dividers 134 are in the stowed position, a portion of the dividers 134B may extend forward relative to the forward side 122 of the headrest 114. In some embodiments, the gripping portion 154 may extend partially forward relative to the forward side 122 of the headrest 114, although in other embodiments, other portions of the divider assembly 130 may extend forward relative to the headrest 114.

Figure 5:
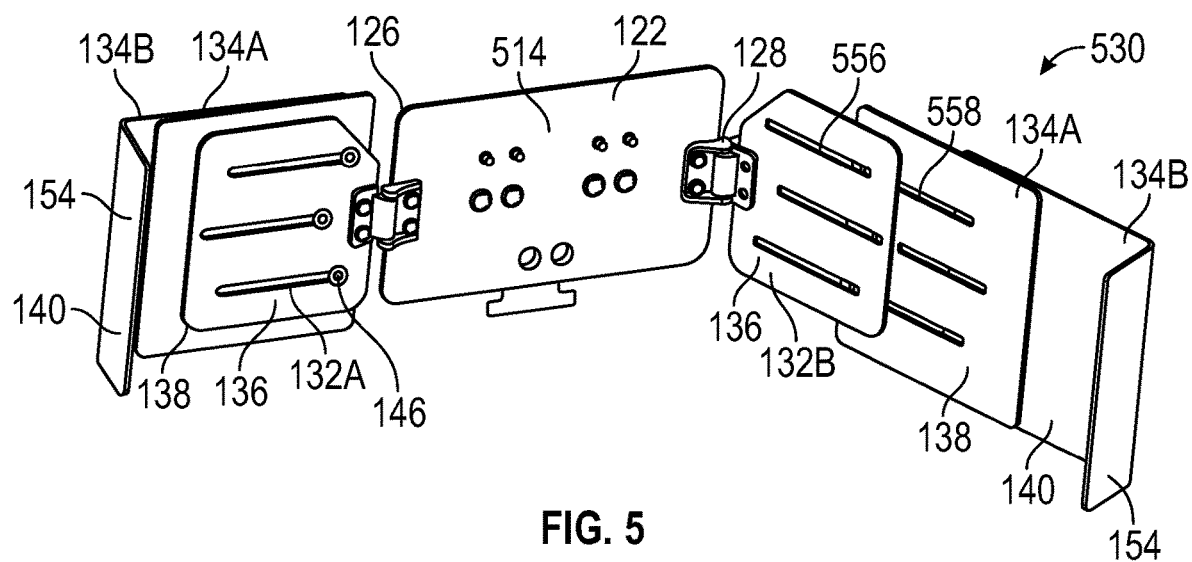
FIG. 5 is a perspective view of a headrest and a divider assembly for a passenger seat according to embodiments of the invention.
Figure 6:
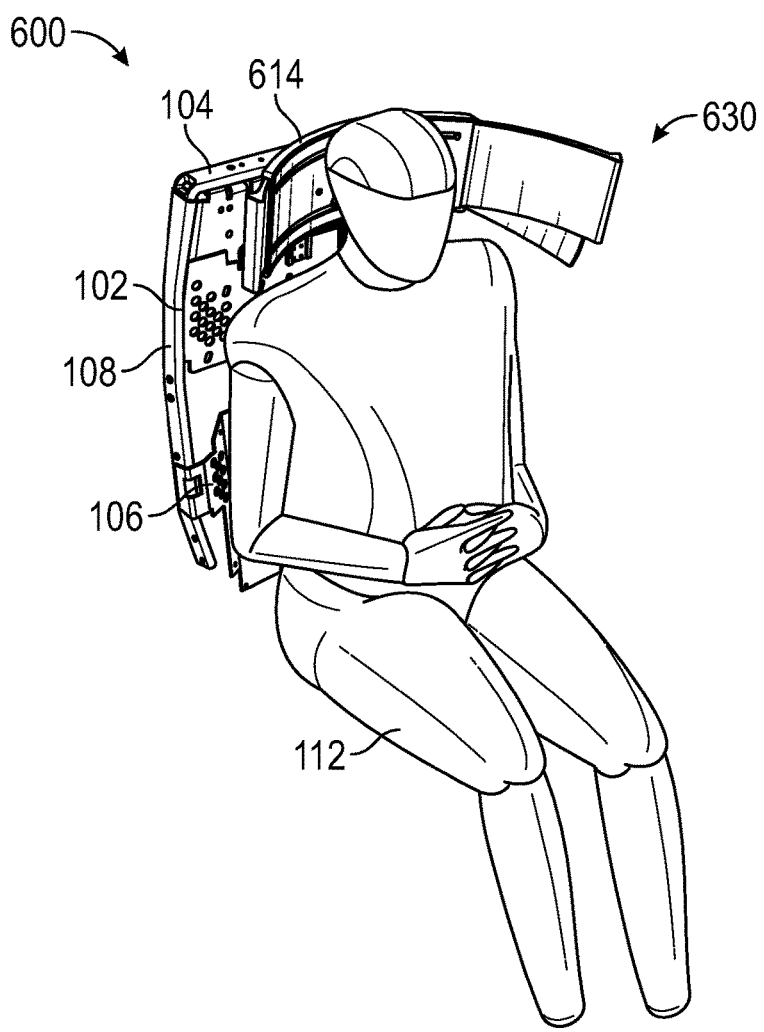
FIG. 6 is a perspective view of a portion of a passenger seat with a headrest and a divider assembly according to embodiments of the invention.

FIG. 5 illustrates an embodiment of another headrest 514 and divider assembly 530 according to various embodiments. The headrest 514 and the divider assembly 130 are substantially similar to the headrest 114 and the divider assembly 130 except that the first divider adjusters 142 include the first pins 146 that are slidable in first slots 556 and the second divider adjuster 144 include the second pins 150 that are slidable in second slots 558.

FIGS. 6-11 illustrate an embodiment of a passenger seat 600 with a headrest 614 and a divider assembly 630 according to various embodiments. The passenger seat 600 is substantially similar to the passenger seat 100. Compared to the headrest 114, and as best illustrated in FIG. 8, the headrest 614 is arcuate shaped in the forward and aft direction such that the lateral sides 126, 128 extend forward compared to a center portion of the headrest 614.

Figure 9:
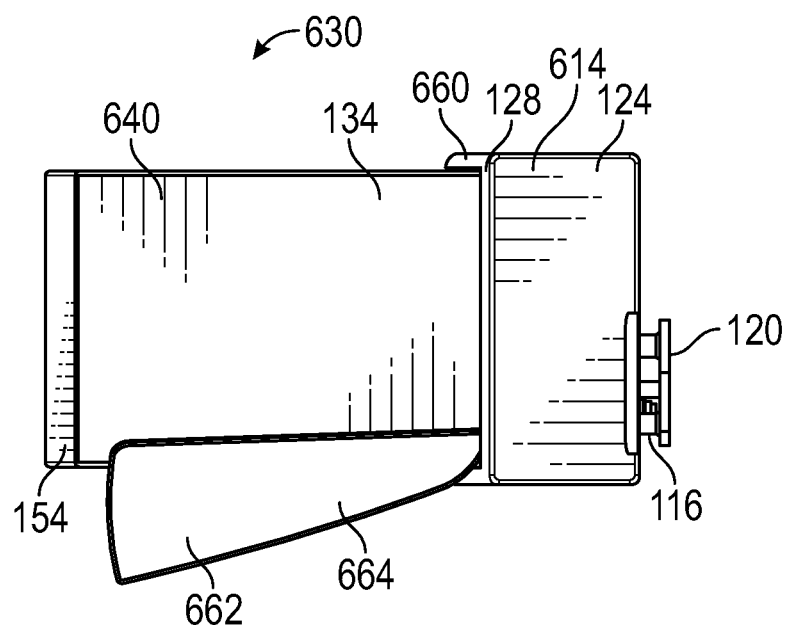
FIG. 9 is a side view of the headrest and divider assembly of FIG. 6.
Figure 10:
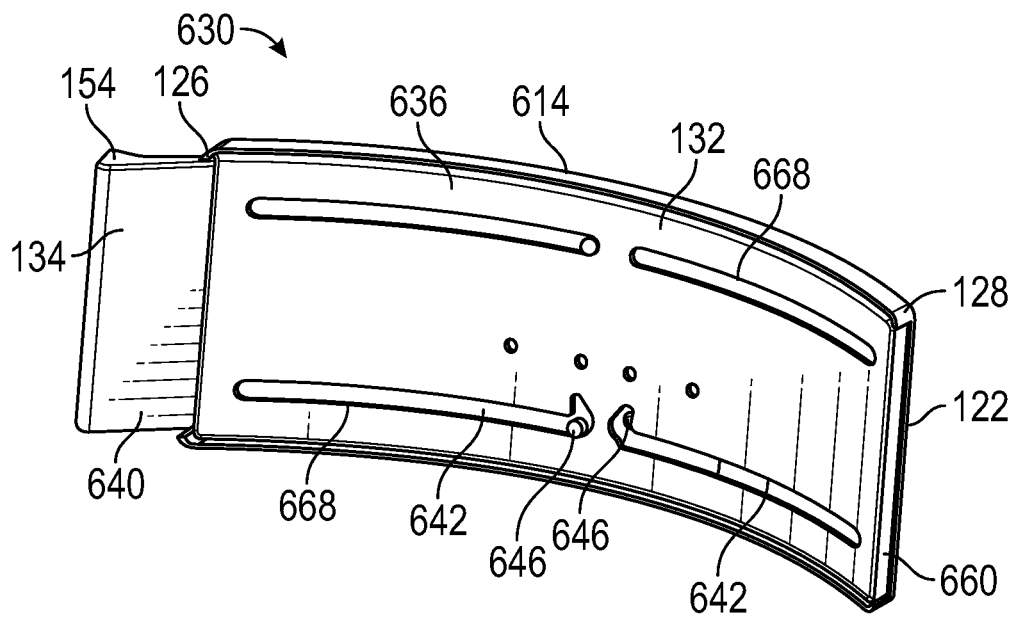
FIG. 10 is a perspective view of the headrest and divider assembly of FIG. 6.
Figure 12:
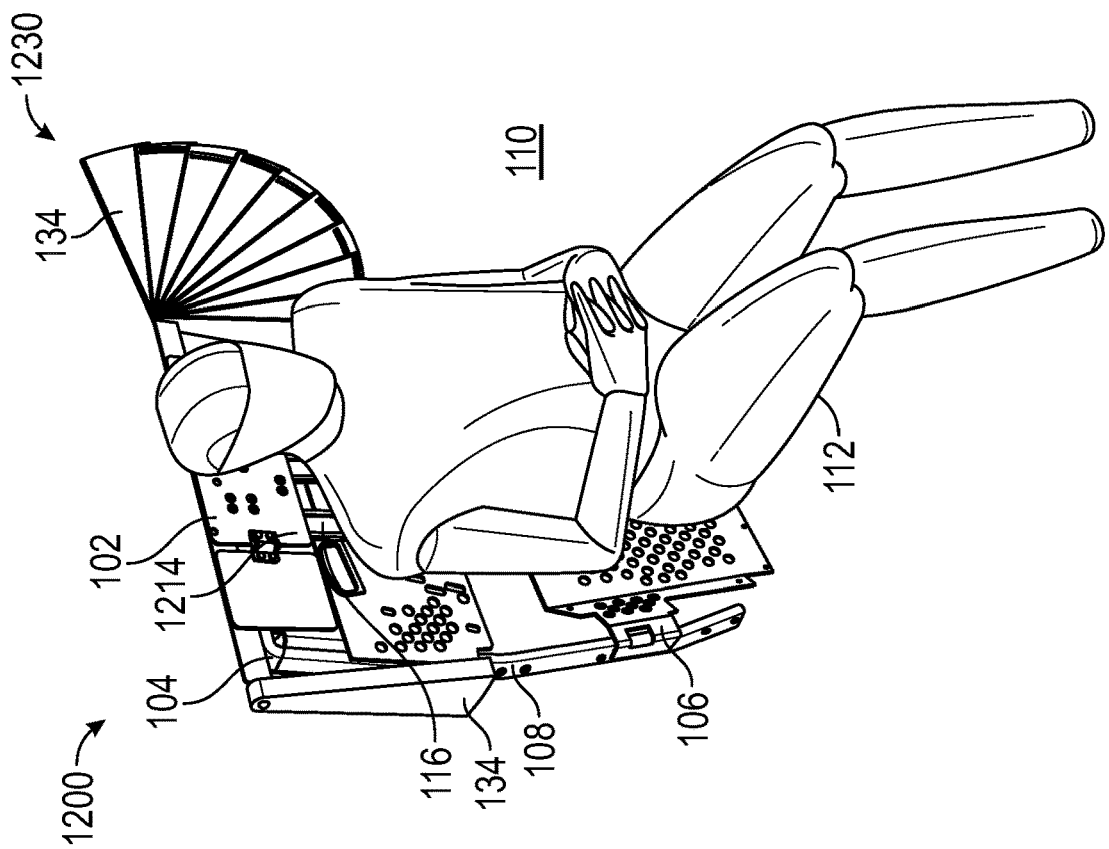
FIG. 12 is a perspective view of a headrest and a divider assembly for a passenger seat according to embodiments of the invention.

In the embodiment of FIGS. 6-11, the divider assembly 630 includes one support 132 and two dividers 134. In this embodiment, the support 132 is a support panel 636 that is attached to the headrest 614. In certain embodiments, the support panel 636 covers the forward surface 122 of the headrest 614. Compared to the support panel 136, the support panel 636 is fixed and/or is not movable relative to the headrest 614. As best illustrated in FIG. 10, the support panel 636 and the headrest 614 together define elongated channels 660 that selectively receive the dividers 134. In certain embodiments, the elongated channels 660 may be arcuate shaped in the forward and aft direction.

The dividers 134 of the divider assembly 630 may be end divider panels 640. Similar to the end divider panels 140, the end divider panels 640 may include the gripping portion 154. Compared to the end divider panels 140, the end divider panels 640 are arcuate shaped in the forward and aft direction such that the end divider panels 640 have an arcuate shaped surface. In certain embodiments, the end divider panels 640 are receivable within the elongated channels 660 and are slidable between the stowed position and the deployed position. FIGS. 7 and 8 illustrate a non-limiting example of the divider assembly 630 with one divider in the stowed position and the other divider in the deployed position. As best illustrated in FIG. 8, in certain embodiments, in both the stowed and deployed positions, the end divider panels 640 may extend forward relative to the forward surface 122 of the headrest 614.

In the embodiment of FIGS. 6-11, each end divider panel 640 is movable relative to the support 132 (and the headrest 614) via divider adjusters 642. The divider adjusters 642 include pins 646 that are slidable in slots 668 defined in the support panel 636. In other embodiments, various other suitable devices or mechanisms may be utilized as the divider adjusters 642.

Figure 11:
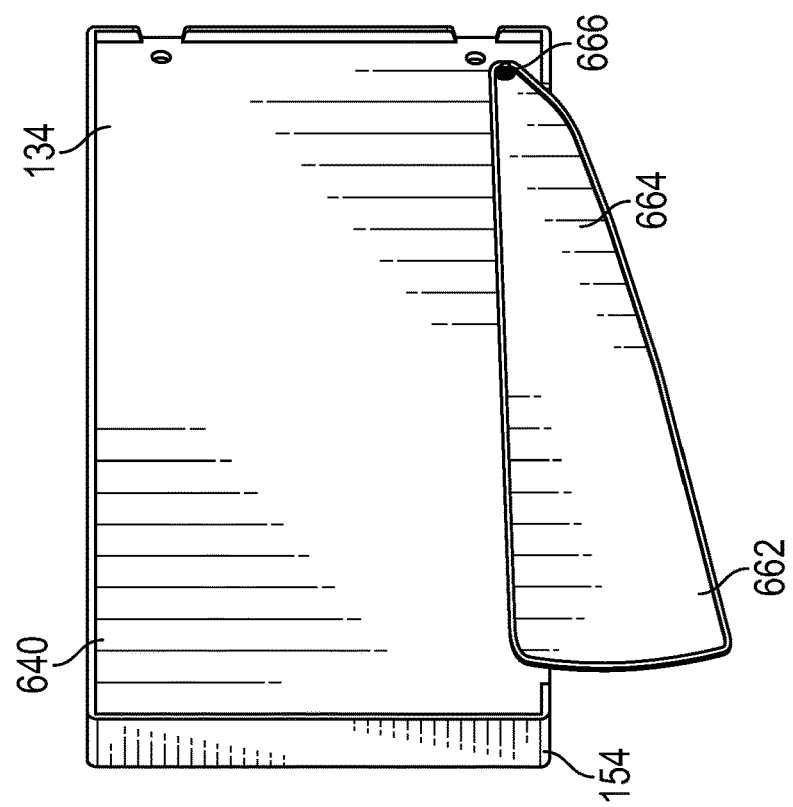
FIG. 11 is a side view of the divider assembly of FIG. 6.
Figure 14:
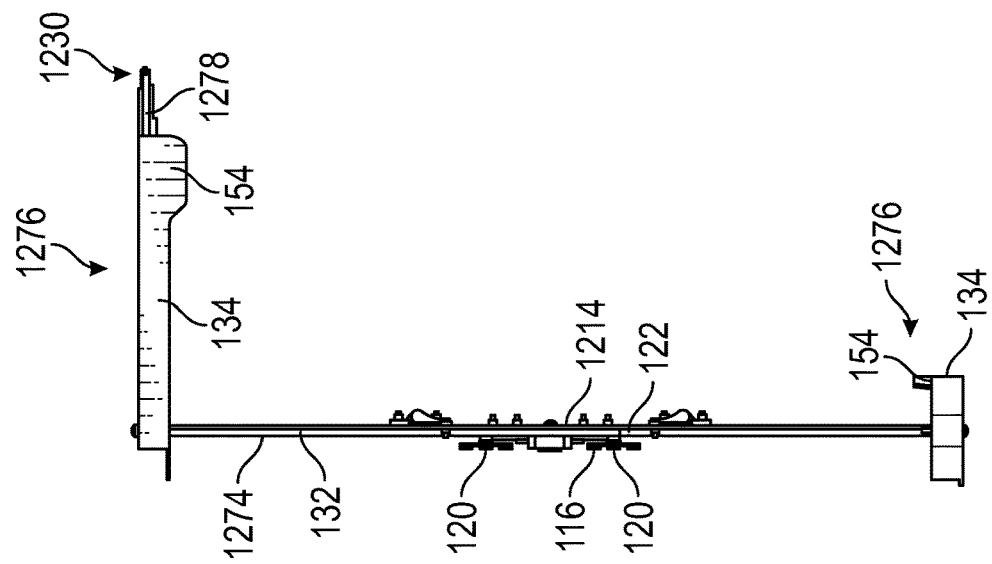
FIG. 14 is a top view of the headrest and divider assembly of FIG. 12.

Optionally, and as best illustrated in FIGS. 7, 9, and 11, a supplemental divider 662 may be provided with the divider assembly 630. In certain embodiments, the supplemental divider 662 may be movable between a stowed position and a deployed position in a direction other than the direction of movement of the divider 134. In the embodiment of FIGS. 6-11, the supplemental divider 662 is movable between the stowed position and the deployed position in a vertical direction. In certain aspects, the supplemental divider 662 may provide additional privacy for the user as desired. In the embodiment of FIGS. 6-11, the supplemental divider 662 is a panel 664 that is attached to the divider 134 and movable about a pivot location 666. In other embodiments, the supplemental divider 662 may include other types of dividers as desired, may be attached to the divider 134 via various suitable mechanisms or devices as desired, and/or may otherwise be movable relative to the divider 132 as desired. In other embodiments, the supplemental divider 662 may be movably attached to the support 132 of the divider assembly.

FIGS. 12-16 illustrate an embodiment of a passenger seat 1200 with a headrest 1214 and a divider assembly 1230 according to various embodiments. The passenger seat 1200 is substantially similar to the passenger seat 100.

Figure 13:
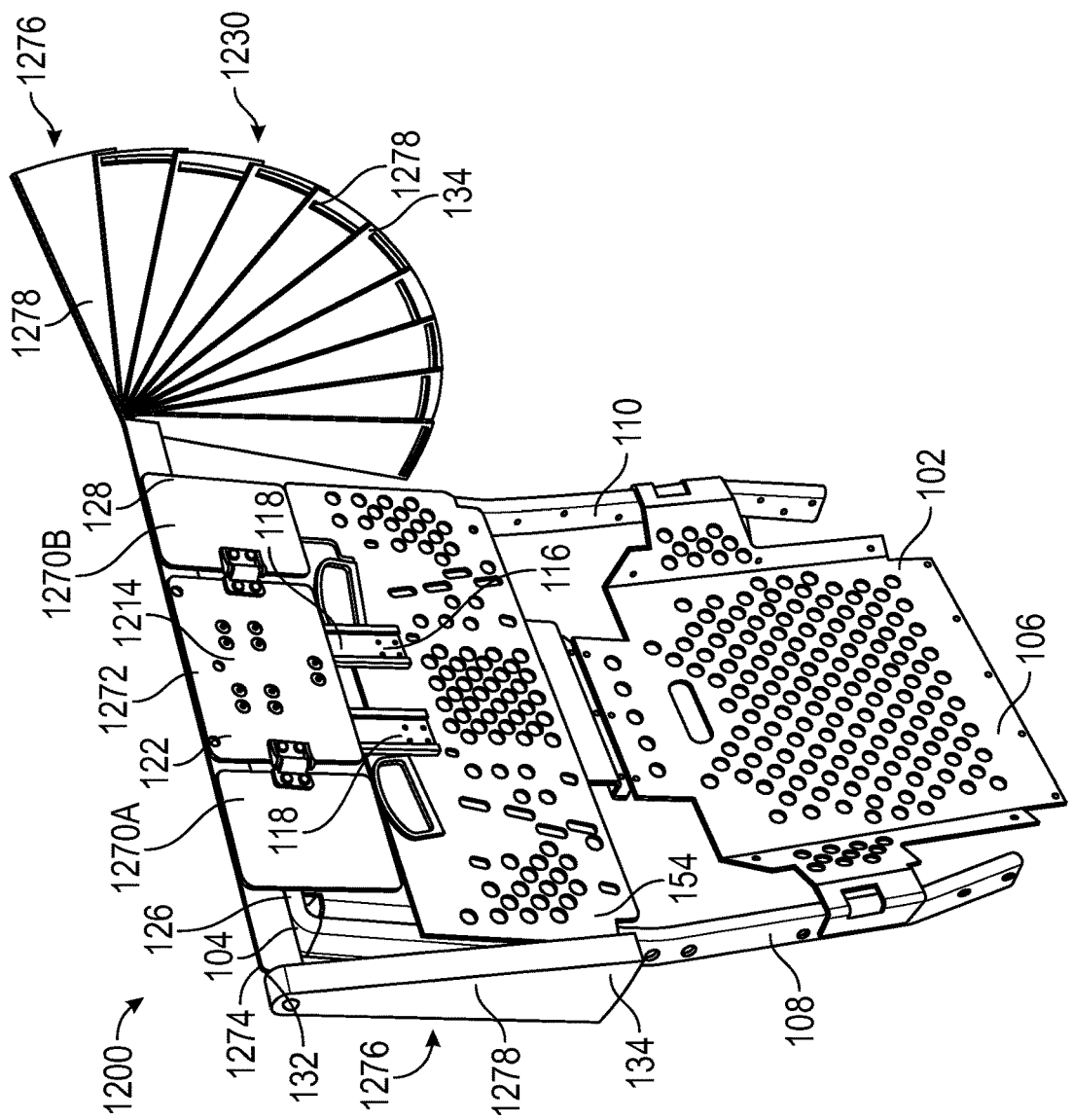
FIG. 13 is another perspective view of the passenger seat of FIG. 12.
Figure 15:
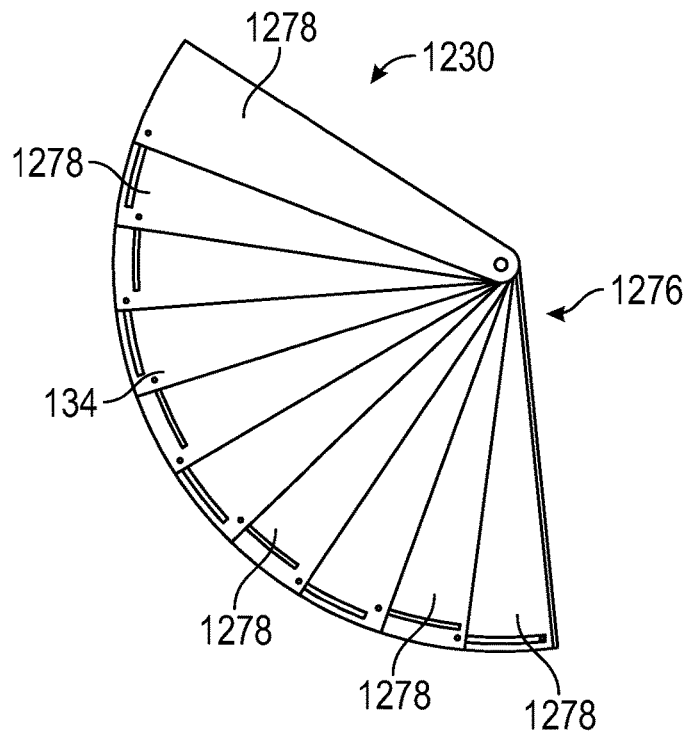
FIG. 15 is a side view of the headrest and divider assembly of FIG. 12.
Figure 16:
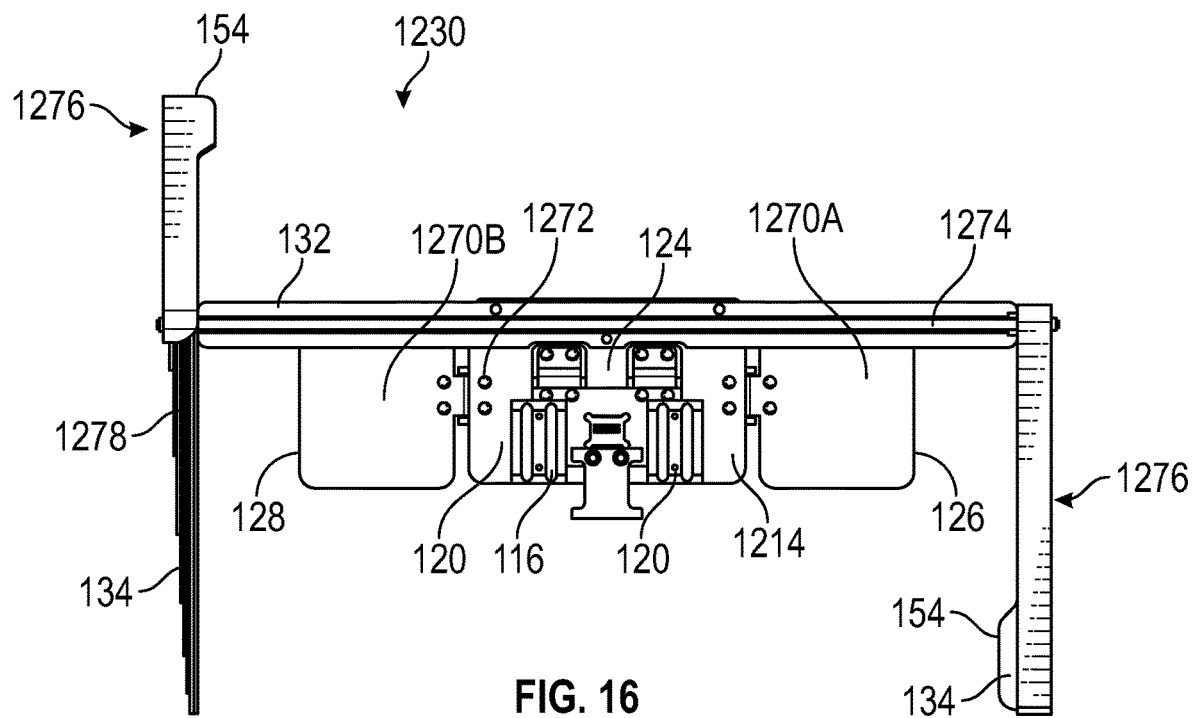
FIG. 16 is a rear view of the headrest and divider assembly of FIG. 12.

Compared to the headrest 114, and as best illustrated in FIGS. 13 and 16, the headrest 1214 includes side wings 1270A-B that are attached to a main panel 1272. In this embodiment, the side wings 1270A-B may be movable relative to the main panel 1272 between a stowed position and a deployed position. In certain embodiments, the side wing 1270A may define the first lateral side 126 and the side wing 1270B may define the second lateral side 128. In various embodiments, in the deployed position, the first lateral side 126 and/or the second lateral side 128 may be positioned forward of the forward side 122 on the main panel 1272. The side wings 1270A-B may be movable independently relative to each other or may be movable together. In other embodiments, the side wings 1270A-B may be omitted.

As illustrated in FIGS. 12-16, the divider assembly 1230 includes one support 132 and two dividers 134. In this embodiment, the support 132 is a support bar 1274 that is attached to the main panel 1272 of the headrest 1214. Compared to the support 132 of the divider assembly 130, the support 132 of the divider assembly 1230 is fixed and/or is not movable relative to the headrest 1214.

In the embodiment of FIGS. 12-16, the dividers 134 include fan assemblies 1276 that are attached to opposing ends of the support bar 1274. Each fan assembly 1276 has a plurality of fan panels 1278 that may be interconnected via various suitable mechanisms or devices as desired, including but not limited to pins and grooves, pins and slots, and/or other suitable devices or mechanisms as desired. Optionally, one of the fan panels 1278 may include a gripping portion 1254 that may be substantially similar to the gripping portion 154. In various embodiments, each fan assembly 1276 may be rotated about an axis defined by the support bar 1274 such that the fan assembly 1276 can be in a stowed position or a deployed position. FIGS. 12-14 and 16 illustrated the divider assembly 1230 with one fan assembly 1276 in the stowed position and the other fan assembly 1276 in the deployed position. In certain aspects, in the deployed position, an exposed surface area of the fan assembly 1276 (and/or a forward-most extent) in the deployed position may be greater than in the stowed position. In various embodiments, each fan assembly 1276 may extend forward of at least the forward side 122 on the main panel 1272 in the deployed position and optionally in the stowed position. In some embodiments, each fan assembly 1276 may extend forward of the lateral sides 126, 128 when the fan assembly is in the deployed position.

Figure 18:
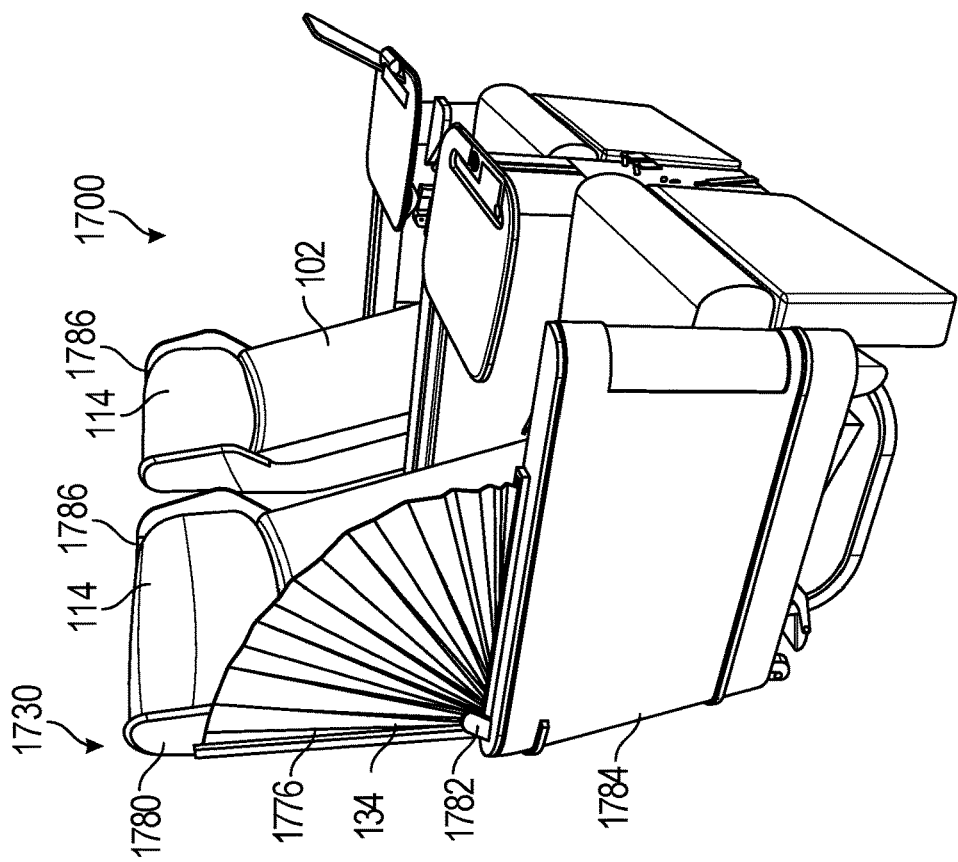
FIG. 18 is another perspective view of the passenger seat of FIG. 17.
Figure 17:
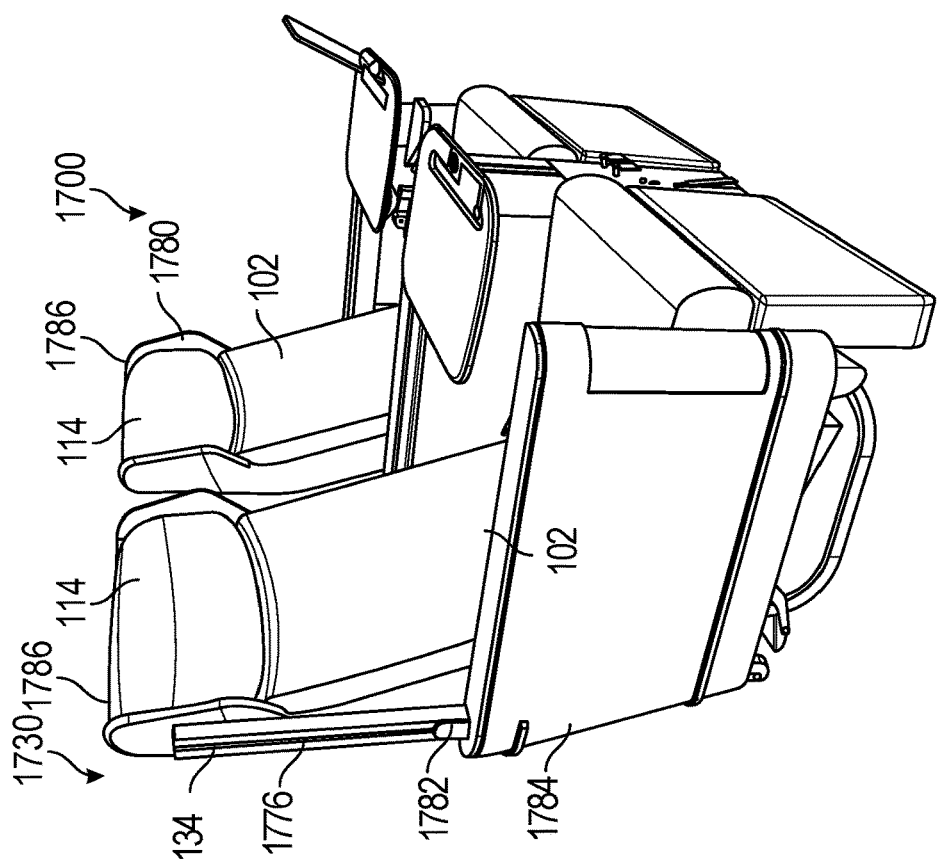
FIG. 17 is a perspective view of a passenger seat with a divider assembly according to embodiments of the invention.

FIGS. 17 and 18 illustrate an embodiment of a passenger seat 1700 and a divider assembly 1730 according to various embodiments. The passenger seat 1700 is substantially similar to the passenger seat 100 except that the passenger seat 1700 includes a seat shell 1780. In the embodiment of FIGS. 17 and 18, the divider assembly 1730 includes a fan assembly 1776 that is substantially similar to the fan assembly 1276. As illustrated in FIGS. 17 and 18, the fan assembly 1776 is pivotably attached to the seat shell 1780 such that the fan assembly 1776 is pivotable about a pivot location 1782 that is proximate to an arm support portion 1784 of the seat shell 1780 between a stowed position (FIG. 17) and a deployed position (FIG. 18). In various embodiments, movement from the stowed position to the deployed position includes a forward and downward movement of the fan assembly 1776.

Figure 20:
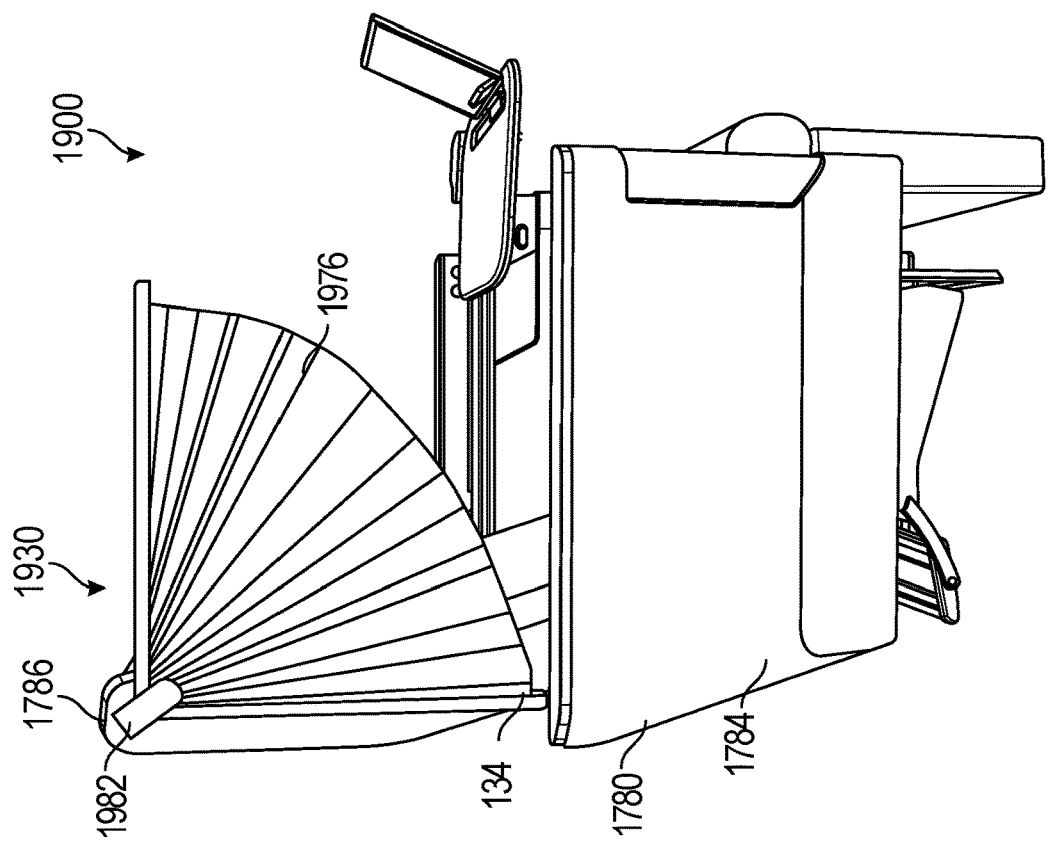
FIG. 20 is another perspective view of the passenger seat of FIG. 19.
Figure 19:
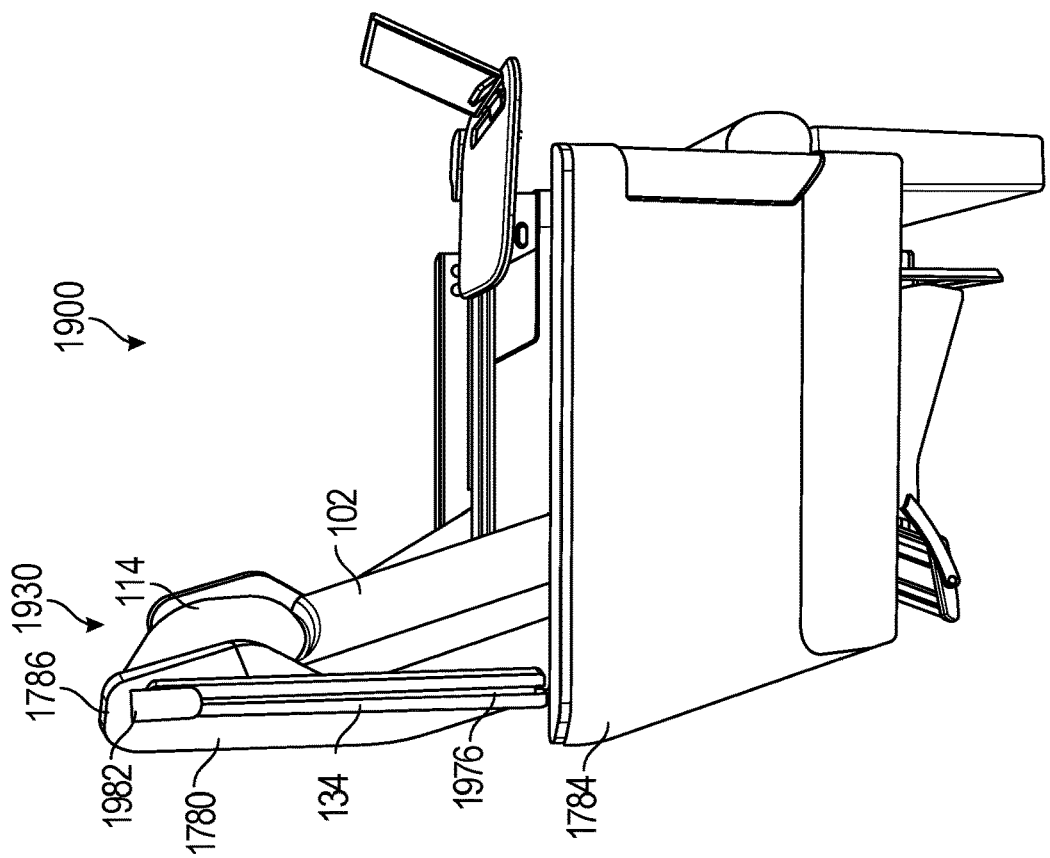
FIG. 19 is a perspective view of a passenger seat with a divider assembly according to embodiments of the invention.
Figure 21:
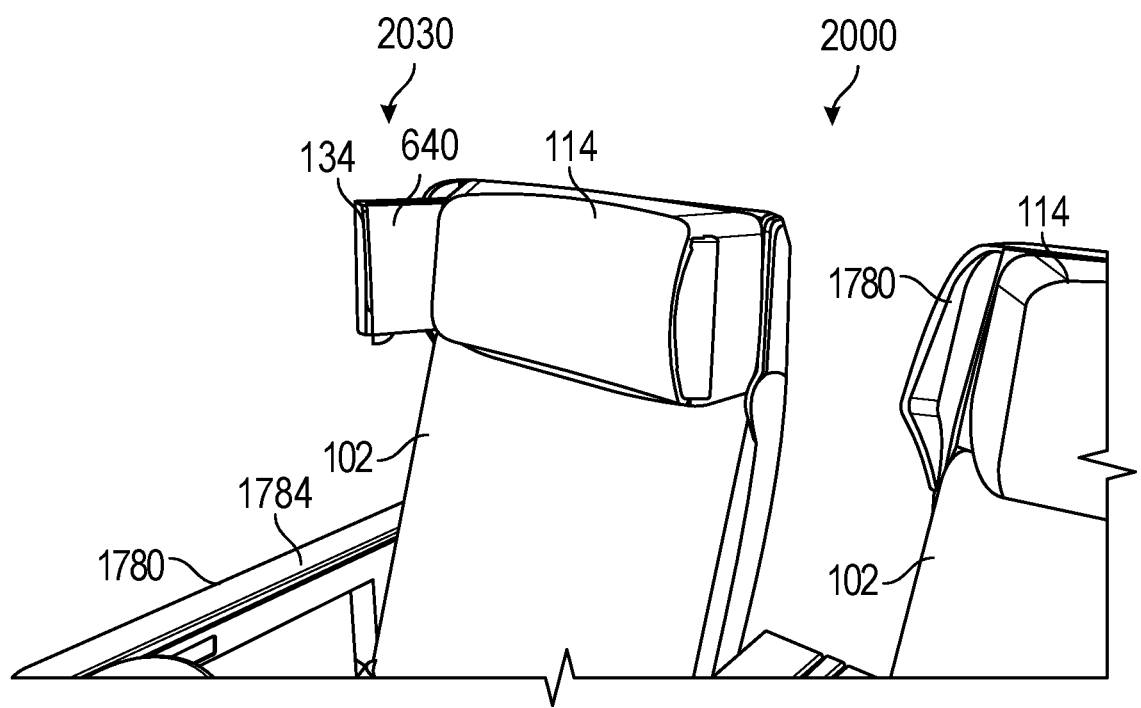
FIG. 21 is a perspective view of a passenger seat with a divider assembly according to embodiments of the invention.

FIGS. 19 and 20 illustrate an embodiment of a passenger seat 1900 and a divider assembly 1930 according to various embodiments. The passenger seat 1900 is substantially similar to the passenger seat 1700, and the divider assembly 1930 is substantially similar to the divider assembly 1730 except that a fan assembly 1976 of the divider assembly 1930 is pivotably attached to the seat shell 1780 such that the fan assembly 1976 is pivotable about a pivot location 1982 that is proximate to a top end 1786 of the seat shell 1780 between a stowed position (FIG. 19) and a deployed position (FIG. 20). In various embodiments, movement from the stowed position to the deployed position includes a forward and upward movement of the fan assembly 1976.

FIG. 20 illustrates an embodiment of a passenger seat 2000 and a divider assembly 2030 according to various embodiments. The passenger seat 2000 is substantially similar to the passenger seat 1700 and includes the seat shell 1780. The divider assembly 2030 is substantially similar to the divider assembly 630 and includes the end divider panel 640 as the divider 134.

In other embodiments, various other suitable types and/or numbers of supports 132 and/or dividers 134 may be utilized as a divider assembly that is attached to a headrest and/or a seat shell of a passenger seat.

A collection of exemplary embodiments are provided below, including at least some explicitly enumerated as "Illustrations" providing additional description of a variety of example embodiments in accordance with the concepts described herein. These examples are not meant to be mutually exclusive, exhaustive, or restrictive; and the disclosure not limited to these examples but rather encompasses all possible modifications and variations within the scope of the issued claims and their equivalents.

Illustration 1. A passenger seat comprising: a seat back; a headrest supported on the seat back, wherein the headrest comprises a pair of opposing lateral sides, and wherein the headrest is adjustable relative to the seat back along an axis; and a divider assembly comprising a divider attached to the headrest, wherein the divider is movable with the headrest relative to the seat back, wherein the divider is movable relative to the headrest between a stowed position and a deployed position, and wherein, in the deployed position, the divider extends forward from a first lateral side of the pair of opposing lateral sides of the headrest.

Illustration 2. The passenger seat of any preceding or subsequent illustrations or combination of illustrations, wherein the divider assembly further comprises a support attached to the headrest, wherein the support attaches the divider to the headrest, and wherein the divider is movable relative to the support.

Illustration 3. The passenger seat of any preceding or subsequent illustrations or combination of illustrations, wherein the support defines an axis, wherein the divider comprises a fan that is rotatable about the axis relative to the support, wherein the fan comprises a fan surface, and wherein, in the deployed position, an exposed portion of the fan surface is greater than an exposed portion of the fan surface in the stowed position.

Illustration 4. The passenger seat of any preceding or subsequent illustrations or combination of illustrations, wherein the support comprises a support panel that is slidable relative to the headrest, and wherein the divider comprises a divider panel that is slidable relative to the support panel.

Illustration 5. The passenger seat of any preceding or subsequent illustrations or combination of illustrations, wherein a sliding axis of the support panel is parallel to a sliding axis of the divider panel.

Illustration 6. The passenger seat of any preceding or subsequent illustrations or combination of illustrations, wherein the support defines an elongated channel that is arcuate shaped in a forward and aft direction, and wherein the divider comprises an arcuate shaped panel that is slidable within the elongated channel between the stowed position and the deployed position.

Illustration 7. The passenger seat of any preceding or subsequent illustrations or combination of illustrations, wherein, in both the stowed position and the deployed position, the divider extends laterally outwards and forward relative to the first lateral side of the headrest.

Illustration 8. A passenger seat comprising: a headrest comprising a first lateral side and a second lateral side: and a divider assembly comprising a support and a divider, wherein the support of the divider assembly attached to the headrest, wherein the divider is movable relative to the support such that the divider is movable relative to the headrest, and wherein the divider is movable relative to the support between a stowed position and a deployed position, wherein, in the deployed position, the divider extends forward from the first lateral side of the headrest.

Illustration 9. The passenger seat of any preceding or subsequent illustrations or combination of illustrations, wherein the headrest comprises a main panel and a side wing, wherein the side wing is movable relative to the main panel between the stowed position and the deployed position, and wherein the side wing defines the first lateral side and the second lateral side.

Illustration 10. The passenger seat of any preceding or subsequent illustrations or combination of illustrations, wherein the support defines an axis, and wherein the divider comprises a fan that is rotatable about the axis relative to the support.

Illustration 11. The passenger seat of any preceding or subsequent illustrations or combination of illustrations, wherein the fan comprises a fan surface, and wherein, in the deployed position, an exposed portion of the fan surface is greater than an exposed portion of the fan surface in the stowed position.

Illustration 12. The passenger seat of any preceding or subsequent illustrations or combination of illustrations, wherein the support comprises a support panel that is slidable relative to the headrest, and wherein the divider comprises a divider panel that is slidable relative to the support panel.

Illustration 13. The passenger seat of any preceding or subsequent illustrations or combination of illustrations, wherein, in both the stowed position and the deployed position, the divider extends laterally outwards and forward relative to the first lateral side of the headrest.

Illustration 14. The passenger seat of any preceding or subsequent illustrations or combination of illustrations, wherein the support defines an elongated channel that is arcuate shaped in a forward and aft direction, and wherein the divider comprises an arcuate shaped panel that is slidable within the elongated channel between the stowed position and the deployed position.

Illustration 15. A passenger seat comprising: a seat back; a headrest supported on the seat back and movable relative to the seat back, wherein the headrest comprises a first lateral side and a second lateral side; and a divider assembly comprising a divider supported on the headrest, wherein the divider is movable relative to the headrest between a stowed position and a deployed position, and wherein, in both the stowed position and the deployed position, the divider extends laterally outwards and forward relative to the first lateral side of the headrest.

Illustration 16. The passenger seat of any preceding or subsequent illustrations or combination of illustrations, wherein, in the deployed position, the divider extends forward relative to the divider in the stowed position.

Illustration 17. The passenger seat of any preceding or subsequent illustrations or combination of illustrations, wherein the divider comprises a fan having a fan surface, wherein, in the deployed position, an exposed portion of the fan surface is greater than an exposed portion of the fan surface in the stowed position.

Illustration 18. The passenger seat of any preceding or subsequent illustrations or combination of illustrations, wherein the divider is slidable relative to the headrest in a forward and aft direction.

Illustration 19. The passenger seat of any preceding or subsequent illustrations or combination of illustrations, wherein the divider assembly further comprises a support panel attached to the headrest, wherein the support panel attaches the divider to the headrest, wherein the divider comprises a divider panel, wherein the support panel is slidable relative to the headrest, and wherein the divider panel is slidable relative to the support panel.

Illustration 20. The passenger seat of any preceding or subsequent illustrations or combination of illustrations, wherein the divider assembly further comprises a support attached to the headrest, wherein the support attaches the divider to the headrest, wherein the support defines an elongated channel that is arcuate shaped in a forward and aft direction, and wherein the divider comprises an arcuate shaped panel that is slidable within the elongated channel between the stowed position and the deployed position.

Different arrangements of the components depicted in the drawings or described above, as well as components and steps or actions not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising:
    a seat back;
    a headrest supported on the seat back, wherein the headrest comprises a pair of opposing lateral sides, and wherein the headrest is adjustable relative to the seat back along an axis; and
    a divider assembly comprising a divider attached to the headrest, wherein the divider is movable with the headrest relative to the seat back and comprises a support panel pivotably attached to the headrest and a plurality of slidably connected divider panels supported on the support panel, wherein the divider is movable relative to the headrest between a stowed position and a deployed position, and wherein, in the deployed position, the support panel and at least one of the plurality of slidably connected divider panels extend forward from a first lateral side of the pair of opposing lateral sides of the headrest.

2. The passenger seat of claim 1, wherein the divider assembly further comprises an end divider panel, wherein the end divider panel is slidably supported on an intermediate divider panel of the plurality of slidably connected divider panels.

3. The passenger seat of claim 2, wherein the end divider panel comprises a gripping portion.

4. The passenger seat of claim 1, wherein at least one of the slidably connected divider panels is slidably supported on the support panel via divider adjusters, and wherein the divider adjusters comprise pins that are slidable in grooves or slots.

5. The passenger seat of claim 4, wherein at least one of the plurality of slidably connected divider panels is movable between a stowed position and a deployed position relative to the support panel.

6. The passenger seat of claim 5, wherein an exposed surface area of the divider assembly when at least one of the plurality of slidably connected divider panels is in the deployed position is greater than an exposed surface area of the divider assembly when at least one of the plurality of slidably connected divider panels is in the stowed position.

7. The passenger seat of claim 1, wherein, in both the stowed position and the deployed position, the divider extends laterally outwards and forward relative to the first lateral side of the headrest.

* * * * *